(12) United States Patent
Heyen

(10) Patent No.: US 7,946,907 B2
(45) Date of Patent: May 24, 2011

(54) SAW BLADE GULLET CONFIGURATION

(75) Inventor: Andre Roland Georges Heyen, Bertrange (LU)

(73) Assignee: Saint-Gobain Abrasives, Inc., Worcester, MA (US)

( * ) Notice: Subject to any disclaimer, the term of this patent is extended or adjusted under 35 U.S.C. 154(b) by 413 days.

(21) Appl. No.: 11/110,525

(22) Filed: Apr. 20, 2005

(65) Prior Publication Data

US 2006/0236838 A1     Oct. 26, 2006

(51) Int. Cl.
*B24D 5/12* (2006.01)
*B28D 1/04* (2006.01)
*D28D 1/24* (2006.01)

(52) U.S. Cl. ......... 451/541; 83/676; 83/835; 125/13.01; 125/15

(58) Field of Classification Search .......... 83/676, 83/835; 125/12, 13.01, 15, 20, 22; 451/527, 451/541, 542, 548, 526, 450, 488, 540, 546, 451/547; 76/112
See application file for complete search history.

(56) References Cited

U.S. PATENT DOCUMENTS

| | | | |
|---|---|---|---|
| 1,711,102 A | 4/1929 | Sierra, Jr. ................... | 83/848 |
| 4,114,494 A | 9/1978 | Budke et al. ................ | 83/835 |
| 4,135,421 A | 1/1979 | Bertram et al. .............. | 83/835 |
| 4,222,298 A | 9/1980 | James ......................... | 83/853 |
| 4,232,578 A | 11/1980 | Stellinger et al. ........... | 83/661 |
| 4,324,163 A | 4/1982 | LaVelle ...................... | 83/855 |
| 4,337,750 A | 7/1982 | Dutcher ...................... | 125/15 |
| 4,516,560 A | 5/1985 | Cruickshank et al. ...... | 125/15 |
| 4,550,708 A | 11/1985 | Roemmele et al. ......... | 425/15 |
| 4,579,984 A | 4/1986 | Bohman ...................... | 72/416 |
| 4,583,515 A | 4/1986 | Ballenger ................... | 125/15 |
| 4,690,024 A | 9/1987 | Chaconas .................... | 83/852 |
| 4,705,017 A | 11/1987 | Lewls .......................... | 125/15 |
| 4,854,295 A | 8/1989 | Sakarcan ..................... | 125/15 |
| 4,867,025 A | 9/1989 | Eklof et al. | |
| 5,182,976 A | 2/1993 | Wittkopp ..................... | 83/835 |
| 5,351,595 A | 10/1994 | Johnston ...................... | 83/848 |
| 5,438,900 A | 8/1995 | Sundstrom ................... | 83/835 |
| 5,471,970 A | 12/1995 | Sakarcan ..................... | 125/15 |
| 5,524,518 A | 6/1996 | Sundstrom ................... | 83/845 |
| 5,555,788 A | 9/1996 | Gakhar et al. ............... | 83/835 |
| 5,603,252 A | 2/1997 | Hayden, Sr. ................. | 83/851 |

(Continued)

FOREIGN PATENT DOCUMENTS

DE     94 00 182 U1     3/1994

(Continued)

OTHER PUBLICATIONS

A.M. Garlicki, "Control of Gullet Cracking in Band Saw Blades", National Research Council of Canada, 1980, pp. 25-29.

(Continued)

*Primary Examiner* — Clark F. Dexter
(74) *Attorney, Agent, or Firm* — Mike W. Crosby

(57) ABSTRACT

A saw blade includes a circular core having a plurality of cutters disposed along a periphery thereof, and a central bore configured to receive an arbor of a rotating power tool. A plurality of gullets is located in spaced relation between the cutters, extending radially inward from the periphery. Each of the gullets includes a neck portion defined by side walls extending radially inward and extending divergently from one another into an arcuate base. The arcuate base extends along concave arcs to a linear base portion disposed at a radially innermost portion thereof, and which intersects a radius of the saw blade.

1 Claim, 4 Drawing Sheets

U.S. PATENT DOCUMENTS

| | | | |
|---|---|---|---|
| 5,884,547 A | 3/1999 | Carlsen et al. | 83/835 |
| 5,891,206 A | 4/1999 | Ellingson | 51/309 |
| 5,896,800 A * | 4/1999 | Curtsinger et al. | 83/835 |
| 6,065,370 A | 5/2000 | Curtsinger et al. | 76/112 |
| 6,167,792 B1 | 1/2001 | Korb et al. | 83/835 |
| D458,948 S | 6/2002 | Chianese et al. | D15/139 |
| D459,375 S | 6/2002 | Chianese et al. | D15/139 |
| D459,376 S | 6/2002 | Chianese et al. | D15/139 |
| 6,408,838 B1 | 6/2002 | Ogata et al. | 125/15 |
| D459,740 S | 7/2002 | Chianese et al. | D15/139 |
| 6,427,573 B1 | 8/2002 | Carlsen et al. | 83/835 |
| 6,681,674 B2 | 1/2004 | Hakansson et al. | |
| 6,691,596 B1 | 2/2004 | Singh et al. | 83/13 |
| 6,729,220 B2 * | 5/2004 | Curtsinger et al. | 83/666 |
| 6,739,227 B2 | 5/2004 | Thompson | 83/13 |
| 7,117,863 B1 * | 10/2006 | Dassoulas et al. | 125/13.01 |
| 2002/0123302 A1 | 9/2002 | Maras et al. | 451/542 |
| 2003/0061920 A1 | 4/2003 | Thompson | 83/13 |
| 2003/0213483 A1 | 11/2003 | Sakarcan | 125/15 |
| 2004/0149114 A1 * | 8/2004 | Brach | 83/835 |

FOREIGN PATENT DOCUMENTS

| | | |
|---|---|---|
| WO | WO 00/43179 A | 7/2000 |

OTHER PUBLICATIONS

International Search Report mailed Apr. 30, 2009, from counterpart International Application No. PCT/US2009/031548, filed Jan. 21, 2009.

International Preliminary Report on Patentability, mailed Jul. 27, 2010, from counterpart International Application No. PCT/US2009/031548, filed on Jan. 21, 2009.

* cited by examiner

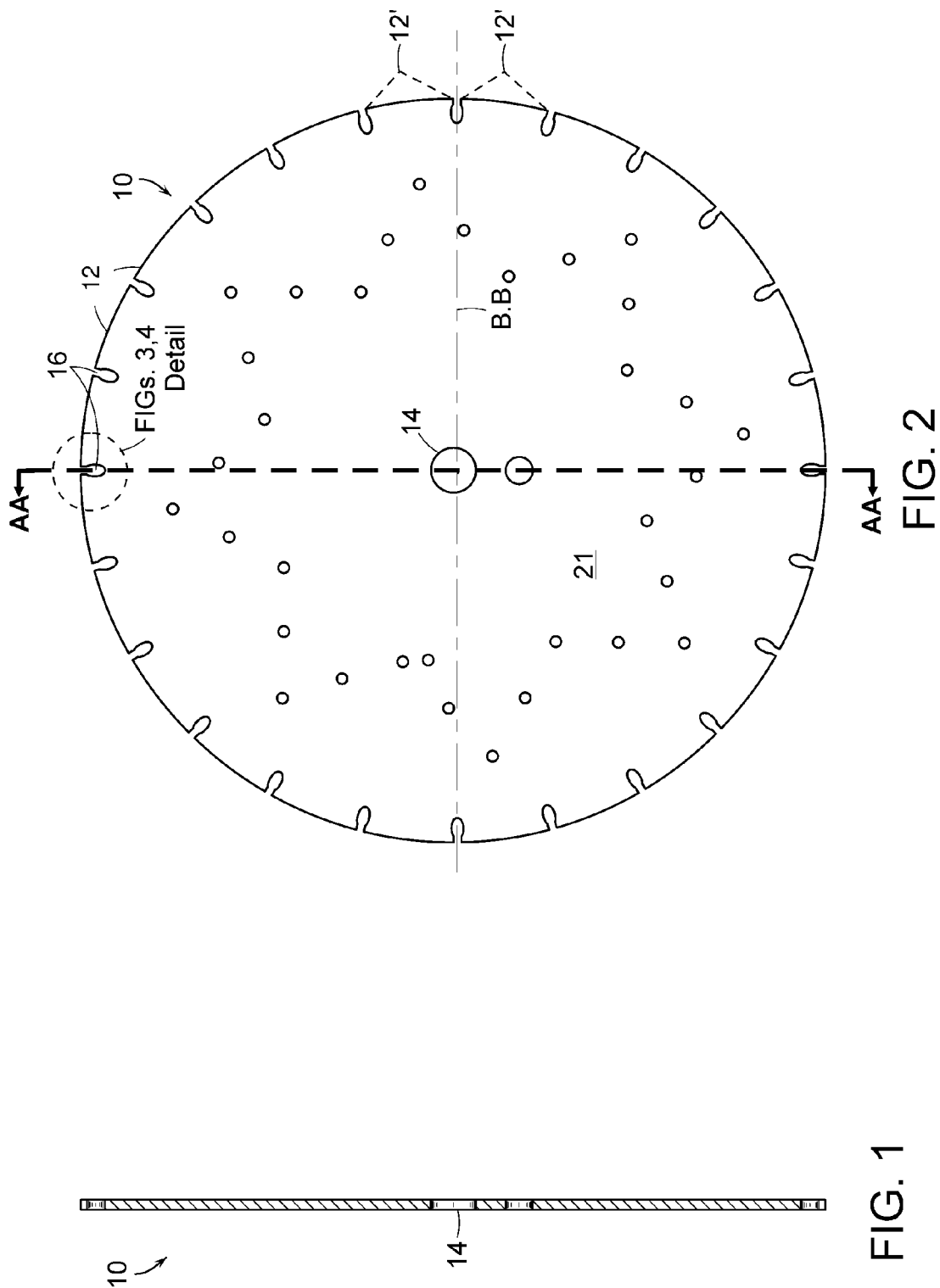

SAW BLADE GULLET CONFIGURATION

BACKGROUND

1. Technical Field

This invention relates to saw blades, and more particularly to circular saw blade having gullets designed to reduce fatigue and increase the life of the blade.

2. Background Information

Conventional circular saw blades typically include a circular steel core having a series of cutters or teeth spaced along the circumference thereof. Gullets, in the form of cutouts extending inwardly from the periphery of the wheel are often interspaced between the cutters to aid cutting, such as by relieving stresses in the blade and for removing swarf. A variety of gullet configurations may be used, including those of generally narrow, wide, and keyhole shapes. The selection of a gullet configuration for a particular saw blade may be based on the cutting application(s) for which the blade is expected to be used.

Saw blades having relatively narrow gullets have been found useful in sawing of construction material with portable power saws, and in other masonry cutting applications on stationary machines, where smooth cutting action is desired. It has been found that the smoothness of cutting action is enhanced when the cutters are placed relatively close to one another, such as provided by the use of relatively narrow gullets. However, cracks tend to propagate from the tightly radiused ends of these gullets, particularly if the blade is exposed to high radial pressure. This problem may be particularly problematic on blades in which a fatigue barrier has been surpassed.

Alternatively, saw blades having relatively wide gullets may be used. These gullets typically have a relatively large radius at their inner ends, which have been found to provide the blade with relatively high fatigue strength. These gullets may thus be beneficial in relatively high-stress cutting environments, such as floor sawing of asphalt or concrete, in which other blade types tend to fail due to stress cracks propagating from the gullets.

Keyhole-shaped gullets attempt to combine the aforementioned benefits of narrow and wide gullets. These gullets enable the cutters of a blade to be positioned relatively close to one another, e.g., to provide a smooth cutting action, while also providing each gullet with a relatively large radius at its radially inner end, e.g., to help reduce crack formation.

While keyhole gullets may exhibit improved characteristics over the narrow and wide gullets in some applications, they are not without drawbacks. For example, results achieved with keyhole gullets have been less than optimal in severe applications involving difficult to cut materials such as steel or a relatively heterogeneous mix of workpiece materials, such as various combinations of masonry and steel materials (e.g., steel reinforced concrete). Under these conditions, cracks have been found to propagate from the ends or sides of the gullets, which may compromise user safety.

Thus, a need exists for a device and method that addresses the aforementioned drawbacks.

SUMMARY

In one aspect of the invention, a saw blade includes a solid circular core having a plurality of cutters disposed along its periphery, and a central bore configured to receive an arbor of a rotating power tool. A plurality of gullets is located in spaced relation between the cutters, extending radially inward from the periphery toward the central bore. Each of the gullets includes a neck portion defined by side walls extending radially inward and extending divergently into an arcuate base. The side walls are parallel to a radius of the blade extending therebetween, and each of the arcuate bases include at least three linear base portions disposed in spaced relation to one another. Two of the linear base portions are located opposite one another and parallel to the radius, while the third linear base portion is located at a radially innermost portion of the base extending orthogonally to the radius. The arcuate bases fair along concave arcs from the two opposed linear base portions to the third linear base portion.

Another aspect of the invention includes a saw blade which includes a circular core having a plurality of cutters disposed along a periphery thereof, and a central bore configured to receive an arbor of a rotating power tool. A plurality of gullets is located in spaced relation between the cutters, extending radially inward from the periphery. Each of the gullets includes a neck portion defined by side walls extending radially inward and extending divergently from one another into an arcuate base. The arcuate base extends along concave arcs to a linear base portion disposed at a radially innermost portion thereof, and which intersects a radius of the saw blade.

In a still further aspect of the invention, a method of fabricating a saw blade includes providing a circular core with a central bore configured to receive an arbor of a rotating power tool, and placing a plurality of gullets in spaced relation around a periphery of the core, each of which extend radially inward from the periphery. Each gullet is configured with a neck portion defined by side walls extending radially inward and extending divergently from one another into a substantially elliptical base. The base is configured to extend along concave arcs to a linear base portion disposed at a radially innermost portion thereof, the linear base portion intersecting a radius of the saw blade. The method also includes placing a plurality of cutters on the periphery of the core between the gullets.

BRIEF DESCRIPTION OF THE DRAWINGS

The above and other features and advantages of this invention will be more readily apparent from a reading of the following detailed description of various aspects of the invention taken in conjunction with the accompanying drawings, in which:

FIGS. 1 and 2 are edge and plan views, with optional portions shown in phantom, of a circular saw blade embodying aspects of the present invention;

DETAILED DESCRIPTION

Figure 3:
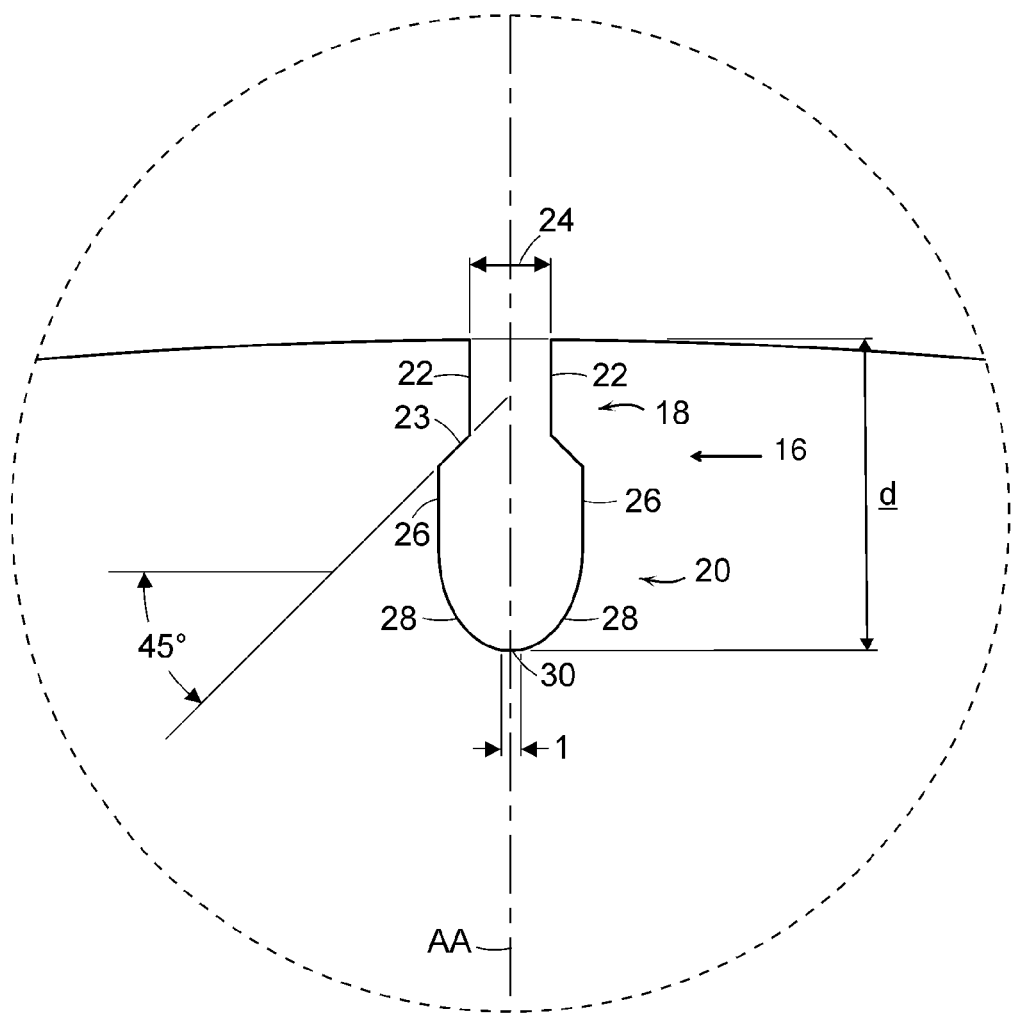
FIG. 3 is a view, on an enlarged scale, of a portion of the saw blade of FIG. 2.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings are indicated with like reference numerals and similar features as shown in alternate embodiments in the drawings are indicated with similar reference numerals.

Briefly, as shown in FIGS. 2-3, an embodiment of the present invention includes a superabrasive (diamond) saw blade 10 having peripheral cutting teeth (e.g. segments) 12 separated by a series of crack-resistant gullets 16. As best shown in FIG. 3, each gullet 16 includes a neck portion 18 defined by parallel side walls 22 extending radially inward from the periphery of the wheel. At the radially inward end of neck portion 18, side walls 22 extend divergently into arcuate base 20. As shown, base 20 is substantially elliptical in shape, though modified to include two opposing parallel linear base portions 26 and a third linear base portion 30 disposed at a radially innermost portion of the base 20. Embodiments of this invention advantageously provide saw blade 10 with improved fatigue life even when used in high-stress cutting environments. While not wishing to be tied to a particular theory, it is believed that base portions 26 help forestall the formation of circumferential cracks, while portion 30 helps resist the formation of radially propagating cracks.

Where used in this disclosure, the term "axial" when used in connection with an element described herein, refers to a direction relative to the element, which is substantially parallel to its center of rotation when the element is installed on arbor means. The term "radial" refers to a direction transverse to the axial direction.

Figure 5A:
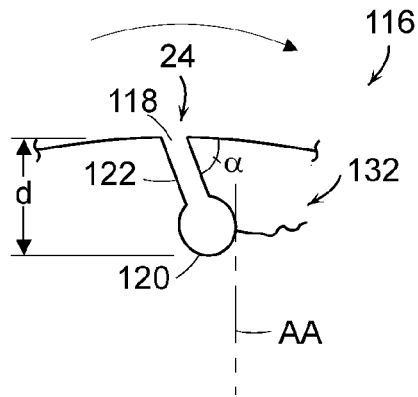
FIGS. 5A, 5B and 6 are views similar to those of FIGS. 3 and 4, on a reduced scale, of gullets of the prior art.
Figure 5B:
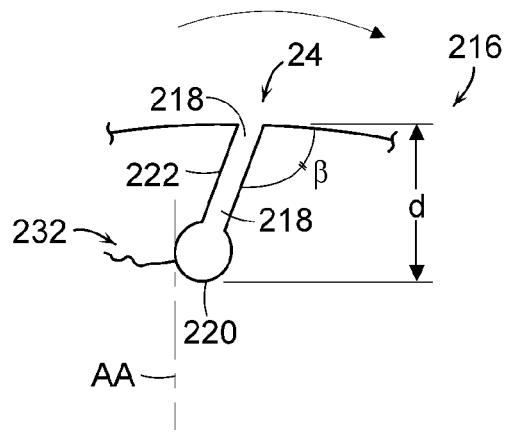
Figure 6:
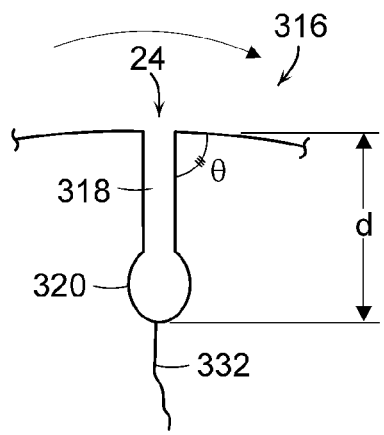

Embodiments of the invention will now be discussed in detail with reference to the appended Figures. An aspect of the invention was the realization that cracks tend to propagate from particular locations of a gullet, based on both the particular cutting application and on various geometric parameters of the gullet. For example, as shown in FIGS. 5A-6 (discussed in greater detail hereinbelow), illustrating the prior art, it was found that when diamond saw blades having angled gullets were used to dry-cut steel, cracks often propagated circumferentially from the acute angle side of the gullets. When diamond saw blades having orthogonal gullets were used to wet-cut floors, cracks tended to propagate radially.

Turning now to FIGS. 1-3, in addition to cutters 12 and gullets 16, saw blade 10 includes a central bore 14 configured to receive a spindle or arbor (not shown), to retain the blade on a conventional power saw. In particular embodiments, as best shown in FIG. 3, neck portion 18 of each gullet 16 is defined by side walls 22 which initially are parallel to a radius AA (of blade 10) extending therebetween. Side walls 22 extend radially inward from the periphery of the blade, and then diverge at 23, e.g., at 45 degree angles from the side walls (e.g., from radial line AA), before blending or fairing into an arcuate base 20. In this embodiment, base 20 generally forms a truncated, modified ellipsoid, extending from parallel base portions 26 into two concave arcuate portions 28, which terminate at linear portion 30 which forms the radially innermost portion of base 20.

As best shown in FIG. 2, embodiments of the present invention may be used with substantially any type of circular blade 10 known to those skilled in the art. For convenience, these embodiments are shown and described with a superabrasive (e.g., diamond) saw blade 10 having a plurality of cutters 12 spaced along its periphery. An example of such a saw blade is disclosed in U.S. Patent Publication No. US2004/019114 to Saint-Gobain Abrasives, Inc., which is fully incorporated by reference herein.

These superabrasive tools are particularly useful in applications where other tools lack the strength and durability to be practical substitutes. For example, diamond saws are routinely used to cut concrete, asphalt, stone, and other hard materials.

In the embodiments shown, cutters 12 take the form of conventional superabrasive-laden segments spaced along the periphery thereof, including abrasive grain brazed or otherwise secured to the surface of core 21. For example, these superabrasive tools may be manufactured by mixing superabrasive particles such as diamond and cubic boron nitride (CBN) with a suitable matrix (bond) powder. The mixture is then compressed in a mold to form the desired shape (e.g., segment 12). The "green" form is then consolidated by sintering at a suitable temperature to form a single body with a plurality of superabrasive particles disposed therein. The consolidated body or segment is attached (e.g., by brazing or laser welding) to a tool body, such as to the round core 21 of a circular saw, to form the final product. In another embodiment, a layer of abrasive grain is brazed or electroplated or otherwise attached to the periphery of the tool body in lieu of abrasive segments.

As mentioned above, these superabrasive blades are intended for relatively difficult cutting operations, which tend to generate high stresses in the blades. These stresses tend to eventually produce stress cracks which propagate from the gullets. For this reason, embodiments of the present invention may be particularly useful when incorporated into otherwise conventional superabrasive saw blades.

Alternatively, saw blade 10 may be provided with cutters in the form of teeth 12', such as shown in phantom. Teeth 12' may be of nominally any size and shape commonly used on saw blades, e.g., to cut relatively soft materials such as wood, plastic, and the like. Teeth 12' may be provided with conventional hardened tips, such as fabricated from tungsten carbide, and/or may be provided with the abrasive grain described hereinabove.

In the embodiment shown, blade 10 includes a metallic core 21, having a central bore or aperture 14 through which the blade 10 may be mounted and fastened to the spindle of a circular saw (not shown) in a conventional manner, e.g., with a threaded fastener. As shown, the core 21 is substantially circular in shape, and may be fabricated from substantially any material having sufficient strength for the particular cutting application. Examples of suitable core materials for some applications include steel, aluminum, titanium, bronze, their composites and alloys, and combinations thereof. For some applications, reinforced plastics may also be used to construct the core. Generally desirable metallic core materials include ANSI 4130 steel and aluminum alloys, 2024, 6065 and 7178.

Figure 4:
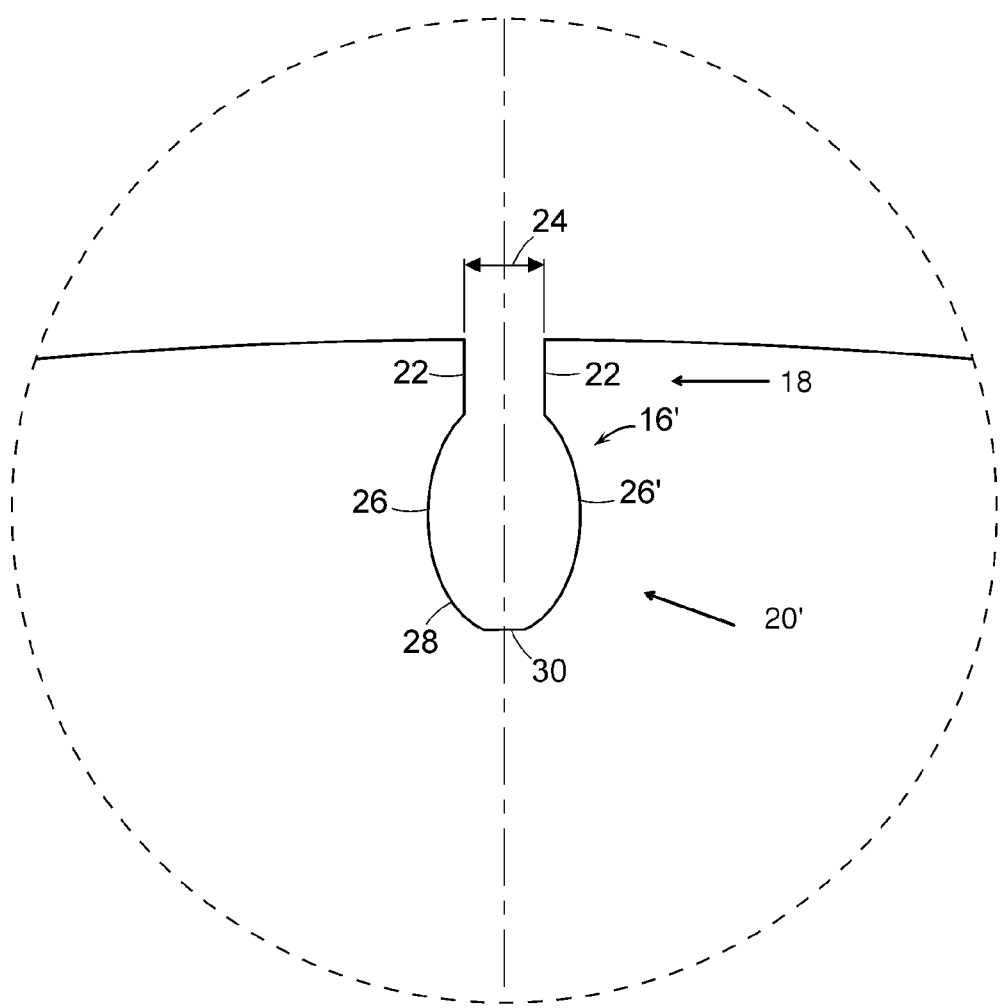
FIG. 4 is a view similar to that of FIG. 3, of an alternate embodiment of the present invention.

Turning now to FIG. 4, an alternate embodiment of the invention includes the aforementioned saw blade equipped with gullets 16'. Each gullet 16' includes a neck portion 18 having side walls 22 that extend divergently into base 20'. Base 20' is generally elliptical, and includes a radially innermost linear portion 30. However, instead of including linear portions 26, portions 26' of base 20' are both continuously concave, e.g., in the form an ovoid or ellipse as shown.

As with gullets 16, it is believed that by eliminating any radius of curvature thereat, linear portion 30 of gullets 16' helps to resist the formation of radially propagating cracks (e.g., of the type shown in FIG. 6, discussed hereinbelow). And, although not linear, it is believed that the relatively large radius of curvature of walls 26' helps to forestall the formation of circumferential cracks (e.g., of the type shown in FIGS. 5A and 5B discussed hereinbelow). Thus, the configuration of gullet 16' is expected to increase the life of the saw blade by decreasing the occurrence of fatigue cracks propagating from the gullets relative to the prior art.

The following illustrative examples are intended to demonstrate certain aspects of the present invention. It is to be understood that these examples should not be construed as limiting.

EXAMPLES

Example 1

Control

Circular saw blades having conventional angled, circular base, keyhole gullets were tested to identify the effect of gullet orientation on crack formation. As shown in FIG. 5A, one saw blade was provided with angled keyhole gullets 116 having neck portions 118 extending at an acute angle α (70°) from the leading portion of the wheel periphery. Another saw blade was provided with similar keyhole gullets 216 having neck portions 218 extending at an obtuse angle β (110°) from the leading portion of the wheel periphery, as shown in FIG. 5B. Gullets 116 extended approximately 9 mm radially inward from the periphery, while gullets 216 extended about 15 mm radially inward. Both gullets included parallel side walls 122, 222, an opening 24 at the periphery of about 3 mm in width, and circular bases 120, 220 having diameters of 0.6 mm.

These saw blades were installed on a gasoline powered handheld saw (STIHL™ TS760, manufactured by Andreas Stihl AG, Waiblingen, Germany), and used to dry cut a steel workpiece until cracks appeared. As shown, gullets 116, 216 both exhibited cracks 132, 232 extending circumferentially from the point of tangency of radius AA with the bases 120, 220. Cracks 132, 232 propagated on the same side of the gullets as the acute angle formed by necks 122, 222 and the closest periphery portion of the blade.

Example 2

Control

A circular saw blade having conventional radially-extending keyhole gullets was also tested. As shown in FIG. 6, these gullets 316 were configured to be substantially similar to gullets 216, though with a neck 318 extending radially inward in a direction substantially orthogonal (i.e., at an angle θ of 90°) from the periphery. This saw blade was installed onto a floor saw (Clipper CSB1 P13, manufactured by Saint-Gobain S.A., Luxembourg) and tested by wet-cutting a concrete workpiece. As shown, gullet 316 developed a crack 332 extending radially inward from the radially innermost portion of base 320.

Example 3

A circular saw blade (Blade 3) of the invention, having gullets 16 substantially as shown and described with respect to FIGS. 1-3 was tested and compared with two other saw blade types (Blades 1 and 2) respectively having short and long necked versions of gullets 316 (FIG. 6). The short necked gullets of Blade 1 were configured as described in Example 2, extending radially inward to a depth d of 9 mm. The long necked gullets of Blade 2 were nominally identical to those of Blade 1, though extending to a depth d of 15 mm.

The gullets of Blade 3 extended to a radial depth d of 10 mm and had a gullet opening 24 of 3 mm. The 45° angled wall portions extended along a notional line that intersected axis AA 1.49 mm radially inward of the wheel periphery. Linear base portions 26 were disposed about 5.2 mm apart, and extended to a radial depth of about 6 mm before fairing into elliptically arced portions 28 which terminated at linear base portion 30 of 1 mm in length.

All three wheel types were tested on an automatic, 14 HP (10.3 kW) cut-off sawing machine (HUARD 30V53, manufactured by HUARD, Amboise, at 5100 rpm (80 m/s) with constant pressure of 600 mbar (25 Kg) applied to an XC48 steel tube (34×26, 4 mm thick) workpiece. The saw blades were of equal diameter and thickness (1.8 mm), and were inspected after each series of thirty cuts. Cutting was stopped as soon as cracks formed. As shown in Table I, this testing indicated that the saw blade of the invention provided a 50% improvement in blade life compared to the prior art control blades under substantially similar conditions.

TABLE I

|  | Blade 1 | Blade 2 | Blade 3 |
|---|---|---|---|
| Number of cuts before first crack | 120 | 120 | 180 |

In the preceding specification, the invention has been described with reference to specific exemplary embodiments thereof. It will be evident that various modifications and changes may be made thereunto without departing from the broader spirit and scope of the invention as set forth in the claims that follow. The specification and drawings are accordingly to be regarded in an illustrative rather than restrictive sense.

Having thus described the invention, what is claimed is:

1. A saw blade, comprising:
   a solid circular core having a plurality of cutters disposed along periphery thereof;
   a central bore configured to receive an arbor of a power tool;
   a plurality of gullets located in spaced relation between the cutters, said gullets extending radially inward from the periphery toward the central bore;
   each of said gullets including a neck portion defined by walls extending radially inward and divergently into arcuate base;
   said side walls each including a portion that is parallel to a radius of said blade extending therebetween and a portion that diverges away from the other side wall and away from said radius;
   each of said arcuate bases including at least three liner base portions disposed in spaced relation to one another;
   two of said liner base portions being disposed opposite one another and parallel to the radius, each of said two parallel liner base portions containing the corresponding diverging portions of said side walls;
   a third one of said liner base portions being disposed at a radially innermost portion of said arcuate base and extending orthogonally to the radius; and
   each of said arcuate bases including elongated concave arcs, each concave arc extending along the radius from a respective one of Saud two parallel liner base portions to said third liner base portion.

* * * * *